United States Patent
Shook et al.

(10) Patent No.: US 8,436,676 B2
(45) Date of Patent: May 7, 2013

(54) CHARGE PUMP

(75) Inventors: Adam L. Shook, Dallas, TX (US);
Byungchul Jang, Ridgeland, MS (US)

(73) Assignee: Texas Instruments Incorporated, Dallas, TX (US)

( * ) Notice: Subject to any disclaimer, the term of this patent is extended or adjusted under 35 U.S.C. 154(b) by 114 days.

(21) Appl. No.: 13/022,120

(22) Filed: Feb. 7, 2011

(65) Prior Publication Data
US 2012/0200340 A1    Aug. 9, 2012

(51) Int. Cl.
*G05F 1/10*    (2006.01)
(52) U.S. Cl.
USPC ........................................................ 327/536
(58) Field of Classification Search .................. 327/535, 327/536, 537
See application file for complete search history.

(56) References Cited

U.S. PATENT DOCUMENTS

| | | | |
|---|---|---|---|
| 7,602,232 B2 * | 10/2009 | Georgescu et al. | 327/536 |
| 7,884,665 B2 * | 2/2011 | Saikusa et al. | 327/536 |
| 8,044,707 B2 * | 10/2011 | Saman et al. | 327/536 |
| 8,179,190 B2 * | 5/2012 | Tranchina et al. | 327/536 |

OTHER PUBLICATIONS

Data Sheet: "High Efficiency, 250-mA Step-Down Charge Pump," Texas Instruments Incorporated, Feb. 22, 2011, pp. 1-24.
Data Sheet: "SpeakerGuard (TM) Subsystem With Mono Class-D Speaker and Stereo Class-G DirectPath (TM) Headphone Amplifier," Texas Instruments Incorporated, Jul. 2010, pp. 1-49.

* cited by examiner

*Primary Examiner* — Jeffrey Zweizig
(74) *Attorney, Agent, or Firm* — Alan A. R. Cooper; Wade J. Brady, III; Frederick J. Telecky, Jr.

(57) ABSTRACT

Traditionally, charge pumps, which used flying capacitors, were limited to a maximum divide ratio of N+1 (where N is the number of flying capacitors). Here, however, a charge pump has been provided that allows for a dramatically increased divide ratio. Specifically, several switched capacitor circuits (which are controlled by a driver) allow for flying capacitors to be arranged to provide a maximum divide ratio of $3 \cdot 2^{(N-1)} - 1$.

20 Claims, 6 Drawing Sheets

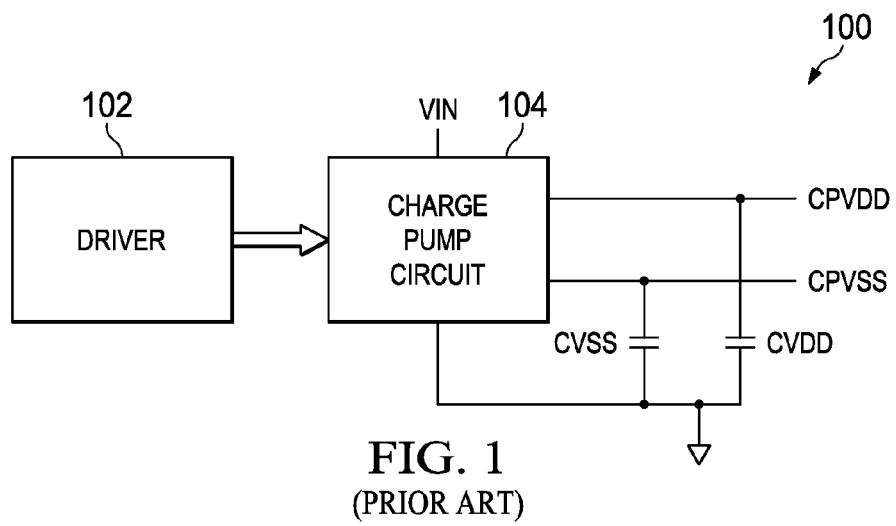
FIG. 1
(PRIOR ART)
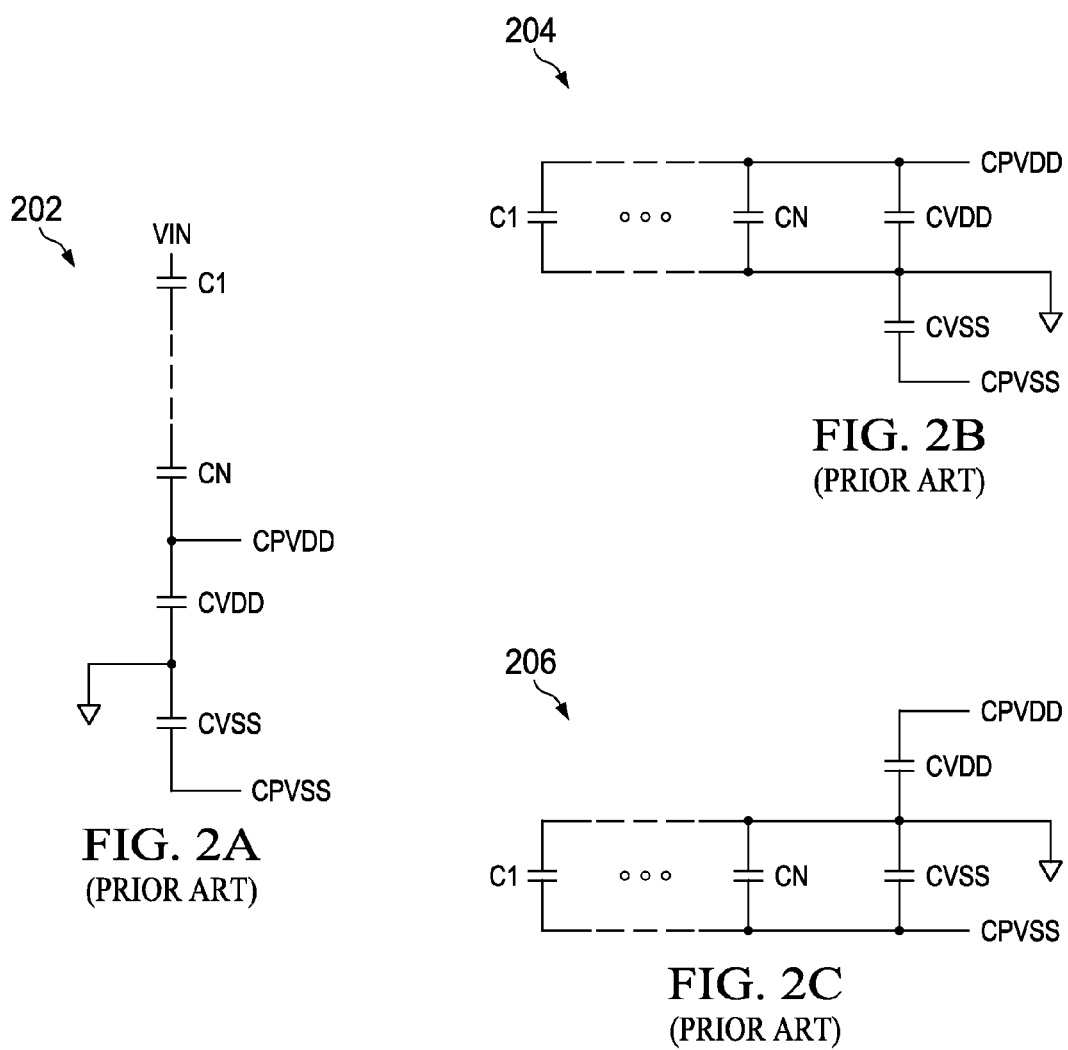
FIG. 2B
(PRIOR ART)
FIG. 2A
(PRIOR ART)
FIG. 2C
(PRIOR ART)

CHARGE PUMP

TECHNICAL FIELD

The invention relates generally to a charge pump and, more particularly, to a split rail charge pump having a large maximum divide ratio.

BACKGROUND

When using a charge pump to divide an input supply to a lower voltage it is desirable to use as few external components (i.e., external to an integrated circuit or IC) in an efficient manner. A step-down charge pump 100 (for example and as shown in FIG. 1) can be used because it has a small number of modes or switching schemes in which it can operate. Generally, this charge pump 100 generally comprises a driver 102, a charge pump circuit 104, and storage capacitors CVDD and CVSS. In operation, charge pump 100 uses three phases 202, 204, and 206 to generate the step down voltages (which can be seen in FIGS. 2A through 2C). In the first phase 202, the driver 102 couples flying capacitors C1 to CN (which are included in the charge pump circuit 104) in series between an input terminal VIN (which supplies an input or supply voltage) and an output terminal CPVDD (which supplies a positive output voltage) so as to charge the flying capacitors C1 to CN. The second and third phases 204 and 206 (which are alternated with the first phase 202) generate positive and negative output voltages at terminals CPVDD and CPVSS, respectively, by coupling the charged flying capacitors C1 to CN in parallel to the storage capacitors CVDD and CVSS, respectively. The largest divide ratio (input voltage divided by output voltage) with the charge pump 100 is N+1, so with two flying capacitors (for example) the largest or maximum divide ratio is 3. Thus, there has generally been a tradeoff between the number of flying capacitors and the divide ratio.

Lower voltages than available with conventional charge pumps alone can be generated with the combination of a step-down charge pump (i.e., charge pump 100) and an LDO (Low Drop-out Regulator). However, this is an inefficient solution as power is wasted in the LDO. Thus, there is a need for an improved charge pump.

An examples of conventional circuits is Texas Instruments' TPS60500 and TPA2055D3.

SUMMARY

A preferred embodiment of the present invention, accordingly, provides an apparatus. The apparatus comprises a driver; and a charge pump that is controlled by the driver, wherein the charge pump includes N switched capacitor circuits that are each coupled to an output terminal, wherein N is an integer, and wherein the charge pump provides a maximum divide ratio of $3 \cdot 2^{(N-1)} - 1$.

In accordance with a preferred embodiment of the present invention, the apparatus further comprises a storage capacitor that is coupled between the output terminal of the charge pump and ground.

In accordance with a preferred embodiment of the present invention, the output terminal of the charge pump further comprise a first output terminal, and wherein the charge pump further comprises a second output terminal that is coupled to each switched capacitor circuit.

In accordance with a preferred embodiment of the present invention, N is 2 and the maximum divide ratio is 5.

In accordance with a preferred embodiment of the present invention, the storage capacitor further comprise a first storage capacitor, and wherein the apparatus further comprises a second storage capacitor that is coupled between the second output terminal of the charge pump and ground.

In accordance with a preferred embodiment of the present invention, each switched capacitor circuit further comprises: a flying capacitor; a set of grounding switches, wherein each grounding switch is coupled to the flying capacitor; and a set of output switches, wherein at least one output switch from the set is coupled between the flying capacitor and the output terminal of the charge pump.

In accordance with a preferred embodiment of the present invention, at least one of the switched capacitor circuits further comprises a set of interconnection switches that are each coupled to the flying capacitor.

In accordance with a preferred embodiment of the present invention, the set output switches for each switched capacitor circuit further comprises: a first output switch that is coupled between the flying capacitor and the first output terminal of the charge pump; and a second output switch that is coupled between the flying capacitor and the second output terminal of the charge pump.

In accordance with a preferred embodiment of the present invention, the first output terminal is a positive voltage rail, and wherein the second output terminal is a negative voltage rail.

In accordance with a preferred embodiment of the present invention, a method is provided. The method comprises in a first phase, coupling at least one of N flying capacitors within a charge pump in series between an input voltage terminal of the charge pump and a first output terminal of the charge pump; in a second phase, equalizing the first output terminal of the charge pump and a second output terminal of the charge pump, wherein a first storage capacitor is coupled between the first output terminal and ground, and wherein the second storage capacitor is coupled between the second output terminal and ground; in a third phase, coupling at least one of the N flying capacitors between a common node and a second output terminal of the charge pump; and in the third phase, iteratively coupling a set of flying capacitors from the N flying capacitors between the common node and the first output terminal of the charge pump with the set of flying capacitors increasing with each iteration, wherein the charge pump has a maximum divide ratio of $3 \cdot 2^{(N-1)} - 1$.

In accordance with a preferred embodiment of the present invention, the step of equalizing further comprises: coupling at least one of the N flying capacitors in parallel to the first storage capacitor; and coupling the at least one of the N flying capacitors in parallel to the second storage capacitor.

In accordance with a preferred embodiment of the present invention, an apparatus is provided. The apparatus comprises a driver; a charge pump having: an input voltage terminal; a first output terminal; a second output terminal; and a plurality of switched capacitor circuits, wherein each switched capacitor circuit is coupled to the first and second output terminals, and wherein each switched capacitor circuit is controlled by the driver, and wherein at least one of the switched capacitor circuits is coupled to the input voltage terminal, and wherein each switched capacitor circuit includes a flying capacitor, and wherein, in an operational mode, the driver couples at least one of the flying capacitors between a common node and the second output terminal and couples a set of i−1 flying capacitors between the common node and the first output terminal of the charge pump so as to have a divide radio of $3 \cdot 2^{(i-1)} - 1$; a first storage capacitor that is coupled between the first output terminal and ground; and a second storage capacitor that is coupled between the second output terminal and ground.

In accordance with a preferred embodiment of the present invention, the operational mode further comprises a first operational mode, and wherein the driver, in a second operational mode, couples at least one of the flying capacitors between the common node and the second output terminal, and a set of flying capacitors between the common node and the first output terminal.

In accordance with a preferred embodiment of the present invention, each flying capacitor has a first electrode and a second electrode, each switched capacitor circuit further comprises: a first grounding switch that is coupled between the first electrode of its flying capacitor and ground; a second grounding switch that is coupled between the second electrode of its flying capacitor and ground; a first output switch that is coupled between the first electrode of its flying capacitor and the first output terminal; a second output switch that is coupled between the second electrode of its flying capacitor and the first output terminal; and a third output switch that is coupled between the second electrode of its flying capacitor and the second output terminal.

In accordance with a preferred embodiment of the present invention, at least one of the switched capacitor circuits further comprises: a first interconnection switch that is coupled between the first electrode of its flying capacitor and an output node; and a second interconnection switch that is coupled between the second electrode of its flying capacitor and the output node.

In accordance with a preferred embodiment of the present invention, at least one of the switched capacitor circuits further comprises an input switch that is coupled between the input terminal and the first electrode of its flying capacitor.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a diagram of an example of a conventional step-down charge pump;

FIGS. 2A through 2C are diagrams of the phases of the charge pump of FIG. 1;

DETAILED DESCRIPTION

Figure 3:
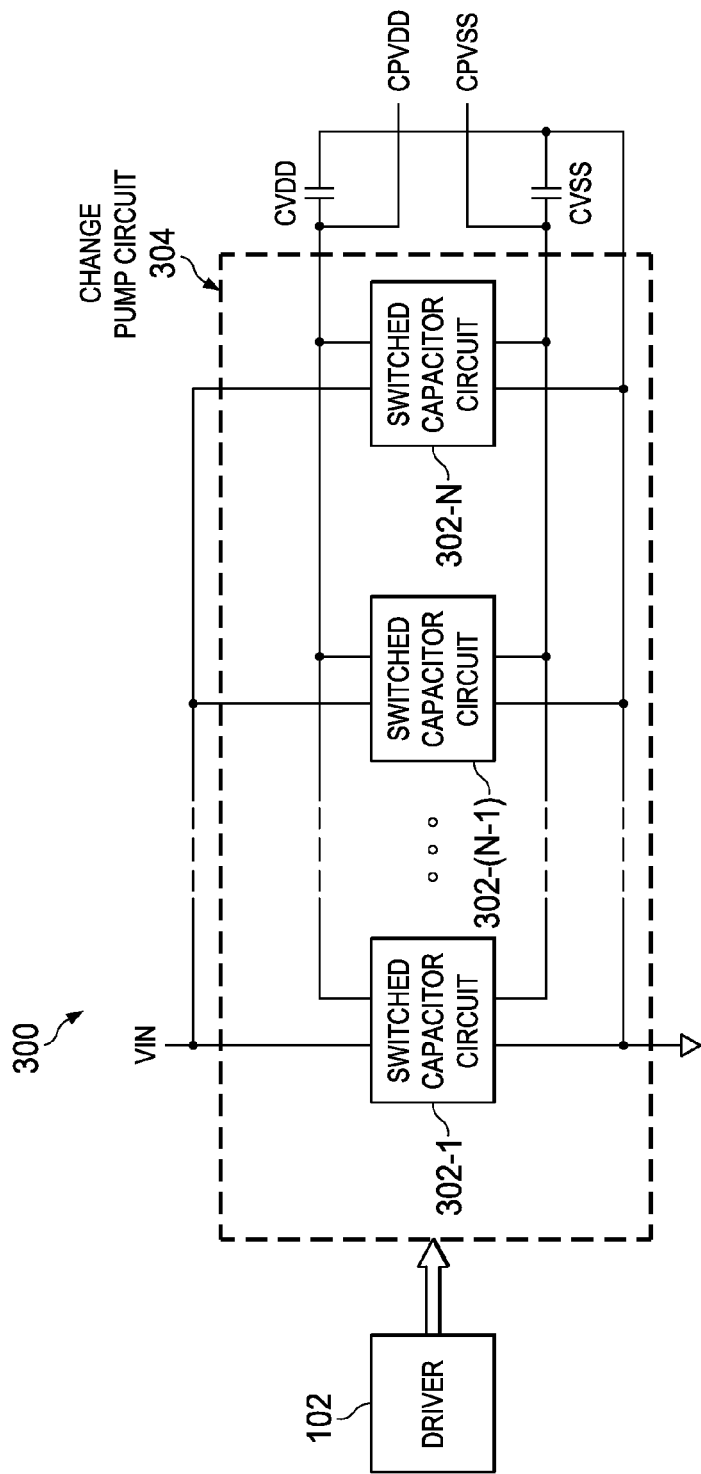
FIG. 3 is diagram of an example of a charge pump in accordance with a preferred embodiment of the present invention.

Refer now to the drawings wherein depicted elements are, for the sake of clarity, not necessarily shown to scale and wherein like or similar elements are designated by the same reference numeral through the several views.

Figure 4:
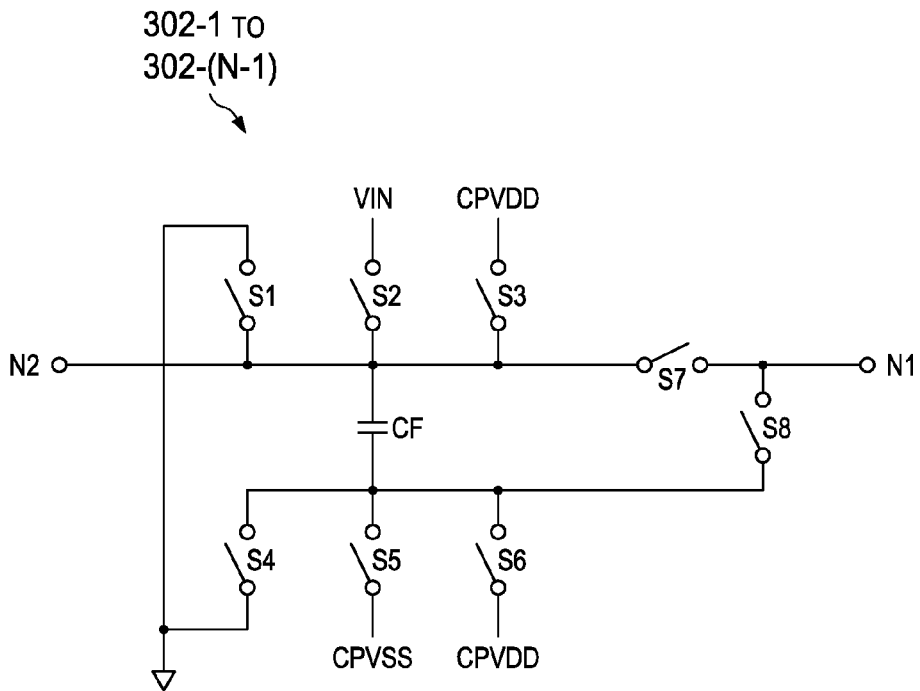
FIGS. 4 and 5 are diagrams of examples of the switched capacitor circuits of FIG. 3.
Figure 5:
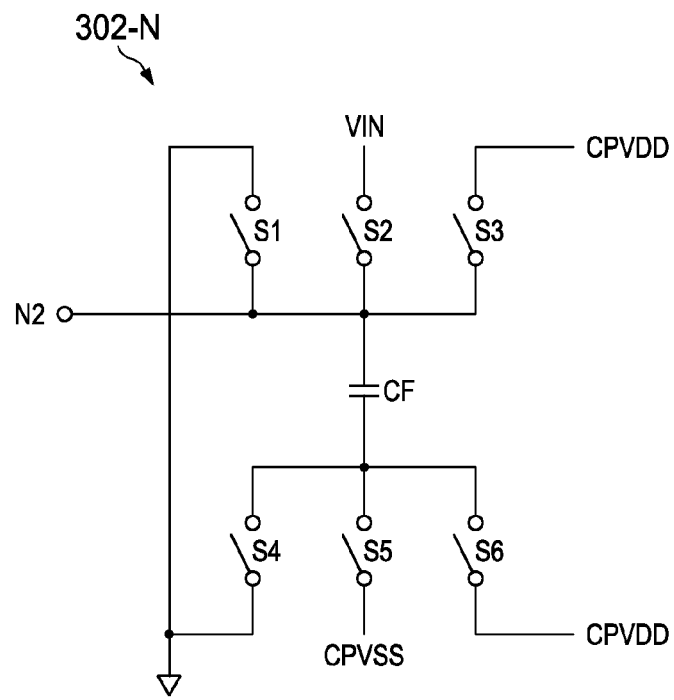
Figure 6A:
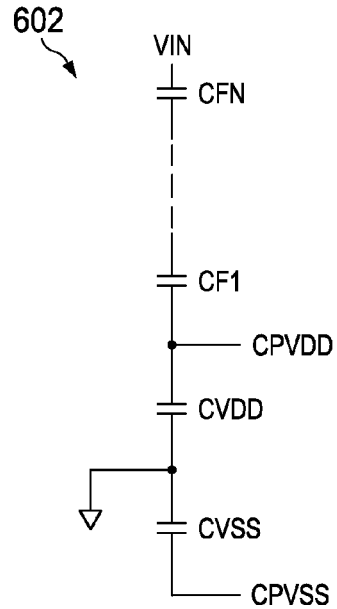
FIG. 6A through 6E are diagrams of the phases of the charge pump of FIG. 3.
Figure 6B:
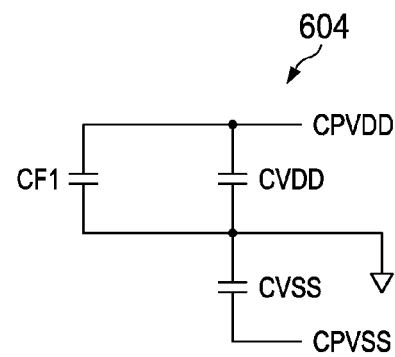
Figure 6C:
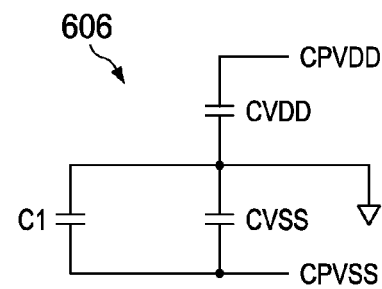
Figure 6D:
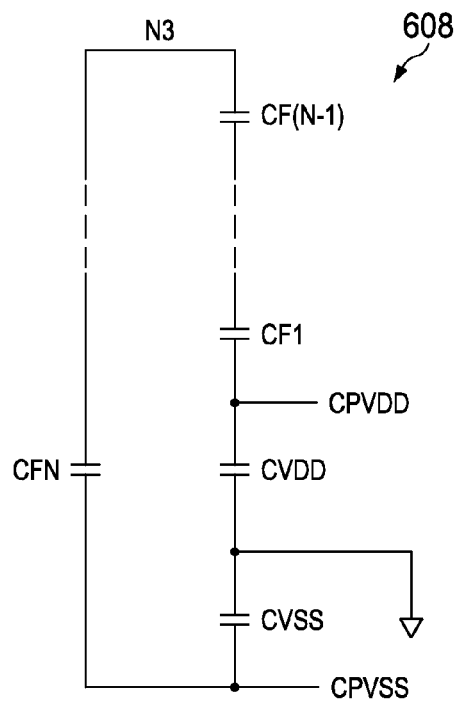
Figure 6E:
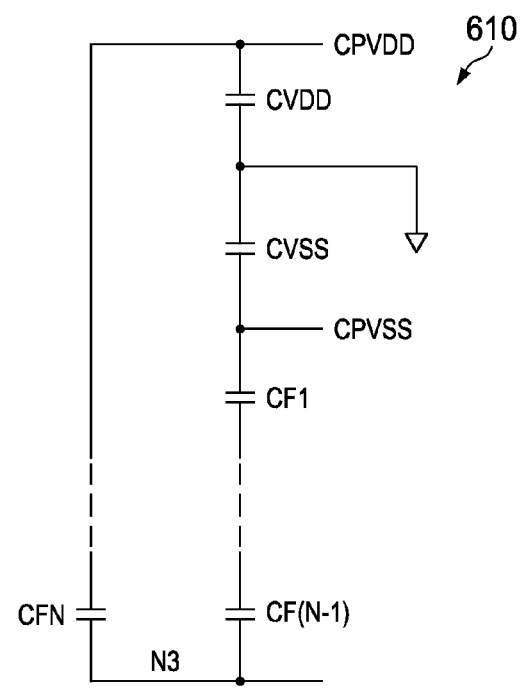

Turning to FIG. 3, an example of a charge pump 300 in accordance with a preferred embodiment of the present invention can be seen. Charge pump 300 generally comprises a driver 102, and charge pump circuit 304, and storage capacitors CVDD and CVSS. The charge pump circuit 304 includes switched capacitor circuits 302-1 to 302-N. Switched capacitor circuits 302-1 to 302-(N−1) (which can be seen in more detail in FIG. 4) are coupled together at their input and output nodes N2 and N1. Switched capacitor circuit 302-N (which can be seen in greater detail in FIG. 5) is coupled to the output node N1 of switched capacitor circuit 302-(N−1) at its input node N2. Each of the switched capacitor circuits 302-1 to 302-N includes grounding switches S1 and S4 and output switches S3 and S6 coupled to each electrode of its flying capacitor Cf, an input switch S2 (which may, optionally included in one or more of switched capacitor circuits 302-1 to 302-N), and an output switch S5 (which is coupled to the output terminal CPVSS). Additionally, switched capacitor circuits 302-1 to 302-(N−1) include interconnect switches S7 and S8 to enable each electrode of its flying capacitor Cf to be coupled to the output node N1.

In one operational mode, the driver 102 can couple the capacitors to generate an output voltage as shown in FIGS. 6A through 6E. In this operational mode, the flying capacitors Cf (labeled Cf1 to CfN) from each of the switched capacitor circuits 302-1 to 302-N can be coupled together between the input terminal VIN and output terminal CPVDD, allowing the flying capacitors Cf and the storage capacitor CVDD to be charged. One of the flying capacitors (labeled Cf1), can then be coupled in parallel with each of storage capacitors CVDD and CVSS to equalize the voltages on output terminals CPVDD and CPVSS. With the voltages being equalized, a positive or negative output voltage can be generated in phases 604 or 606, respectively. The maximum divided ratio is $3 \cdot 2^{(N-1)}-1$. For example for a divided ratio of 5, N is 2. To accomplish this, one flying capacitor (labeled CfN) is coupled between the output terminal CPVDD (for phase 610) or CPVSS (for phase 608) and a common node N3. Then, iteratively, the remaining flying capacitors (labeled Cf1 to Cf(N−1)) are coupled between the common node N3 and output terminal CPVDD (for phase 608) or CPVSS (for phase 610), with the number of flying capacitors increasing with each iteration. Fewer flying capacitors Cf may also be used to provide other, smaller division ratios (i.e., divide ratio of 4 when N is 2).

Figure 7A:
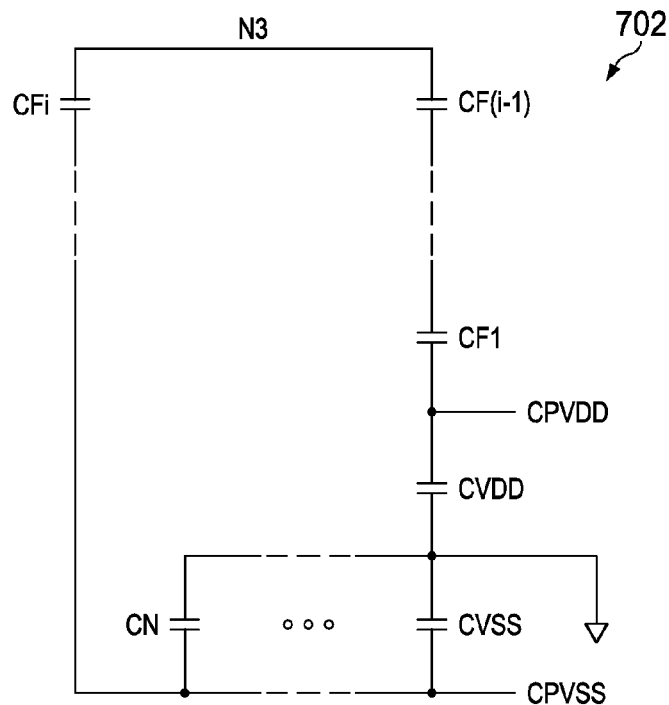
FIGS. 7A and 7B show a set of flying capacitors (CfN) is coupled between the output terminal CPVDD (for phase 704) or CPVSS (for phase 702) and ground.
Figure 7B:
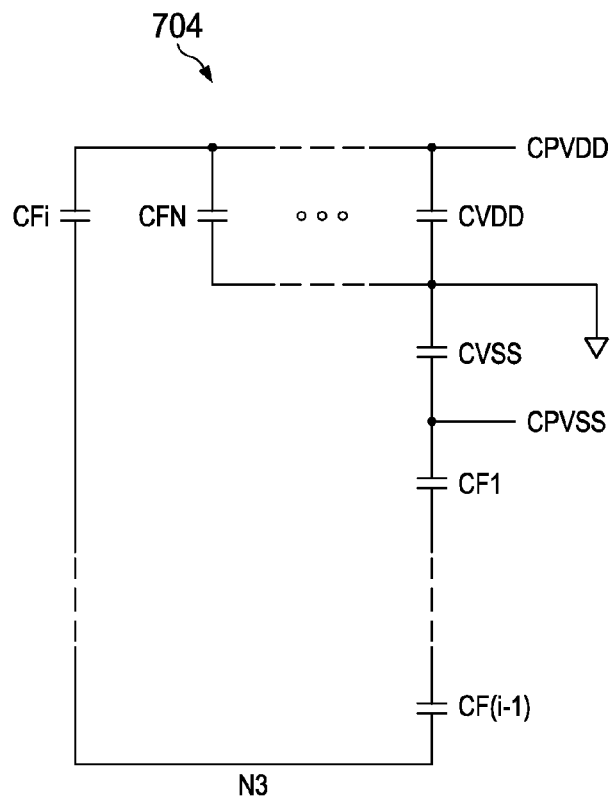

In another operational mode, other fractional divided ratios (i.e., division ratio of 4 when N is 2) can also be generated. As with the operational mode described above, phases similar phases 602, 604, and 606 can be used to charge the flying capacitors Cf (labeled Cf1 to CfN) and to equalize the voltages on output terminals CPVDD and CPVDD. Then, as shown in FIGS. 7A and 7B, a set of flying capacitors (CfN) is coupled between the output terminal CPVDD (for phase 704) or CPVSS (for phase 702) and ground, and capacitor Cf1 is coupled between the common node an the output terminal CPVDD (for phase 704) or CPVSS (for phase 702). The remaining flying capacitors (labeled Cf1 to Cf(i−1)) are coupled between the common node N3 and output terminal CPVDD (for phase 702) or CPVSS (for phase 704).

Figure 8:
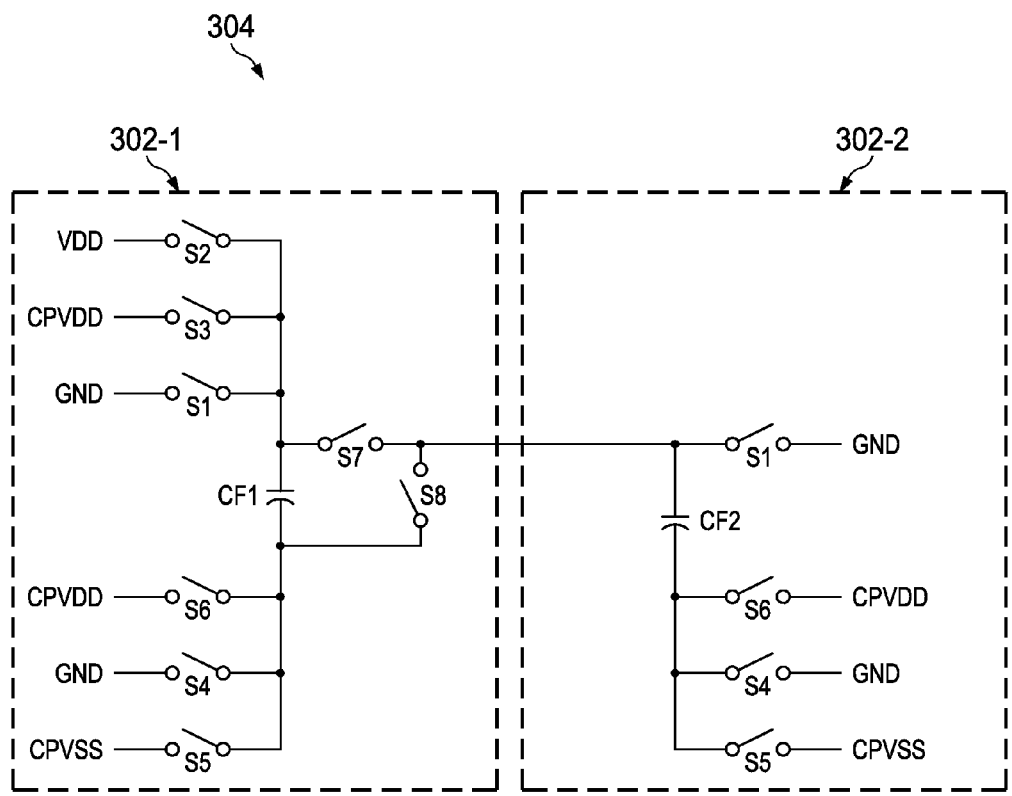
FIG. 8 illustrates a working example of charge pump circuit 304.

Turning now to FIG. 8, a working example of charge pump circuit 304, which has two switched capacitor circuits 302-1 and 302-2 can be seen. This example shown in FIG. 8 is a specific example of the charge pump 300 described above, and the same reference numerals used are used herein for clarity. For this example, since N is 2, the maximum divided ratio is 5. In Tables 1 through 6 below, the switches S1 through S7 and S3 through S6 from 302-1 and 302-2 (respectively) can be actuated to charge, equalize, and generate output voltages having a divide ratio of 5, 4, 3, 2, 3/2, and 1, respectively.

TABLE 1

Divide by 5

| Switched Capacitor Circuit | Switch | Charge | Equalize | Output |
|---|---|---|---|---|
| 302-1 | S2 | X | | |
|  | S3 | | X | |
|  | S1 | | | |
|  | S6 | | | |
|  | S4 | | | |
|  | S5 | | X | |
|  | S7 | | X | X |
|  | S8 | X | | |
| 302-2 | S1 | X | | |
|  | S6 | X | | X |
|  | S4 | | X | |
|  | S5 | X | | |

TABLE 2

Divide by 4

| Switched Capacitor Circuit | Switch | Charge | Equalize | Output |
|---|---|---|---|---|
| 302-1 | S2 | X | | |
|  | S3 | | X | X |
|  | S1 | | | |
|  | S6 | | | |
|  | S4 | | | |
|  | S5 | | X | X |
|  | S7 | | | X |
|  | S8 | X | | |
| 302-2 | S1 | | X | |
|  | S6 | X | | |
|  | S4 | | | X |
|  | S5 | | X | |

TABLE 3

Divide by 3

| Switched Capacitor Circuit | Switch | Charge | Equalize | Output |
|---|---|---|---|---|
| 302-1 | S2 | X | | |
|  | S3 | | X | |
|  | S1 | X | | |
|  | S6 | | | |
|  | S4 | | | X |
|  | S5 | | X | |
|  | S7 | | | X |
|  | S8 | X | | |

TABLE 3-continued

Divide by 3

| Switched Capacitor Circuit | Switch | Charge | Equalize | Output |
|---|---|---|---|---|
| 302-2 | S1 | | X | |
|  | S6 | X | | |
|  | S4 | | | X |
|  | S5 | | X | |

TABLE 4

Divide by 2

| Switched Capacitor Circuit | Switch | Charge | Equalize | Output |
|---|---|---|---|---|
| 302-1 | S2 | X | | |
|  | S3 | | | X |
|  | S1 | | X | |
|  | S6 | X | | |
|  | S4 | | | X |
|  | S5 | | X | |
|  | S7 | X | | X |
|  | S8 | | | |
| 302-2 | S1 | | X | |
|  | S6 | X | | |
|  | S4 | | | X |
|  | S5 | | X | |

TABLE 5

Divide by 3/2

| Switched Capacitor Circuit | Switch | Charge | Equalize | Output |
|---|---|---|---|---|
| 302-1 | S2 | X | | |
|  | S3 | | | X |
|  | S1 | | X | |
|  | S6 | X | | |
|  | S4 | | | |
|  | S5 | | | |
|  | S7 | X | | |
|  | S8 | | X | X |
| 302-2 | S1 | | | |
|  | S6 | X | | |
|  | S4 | | | X |
|  | S5 | | X | |

TABLE 6

Divide by 1

| Switched Capacitor Circuit | Switch | Charge | Output |
|---|---|---|---|
| 302-1 | S2 | X | |
|  | S3 | X | |
|  | S1 | | X |
|  | S6 | | |
|  | S4 | X | |
|  | S5 | | X |
|  | S7 | X | |
|  | S8 | | |

TABLE 6-continued

Divide by 1

| Switched Capacitor Circuit | Switch | Charge | Output |
|---|---|---|---|
| 302-2 | S1 | | X |
| | S6 | | |
| | S4 | X | |
| | S5 | | X |

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
    a driver; and
    a charge pump that is controlled by the driver, wherein the charge pump includes N switched capacitor circuits that are each coupled to an output terminal, wherein N is an integer, and wherein the charge pump provides a maximum divide ratio of $3 \cdot 2^{(N-1)} - 1$.

2. The apparatus of claim 1, wherein the apparatus further comprises a storage capacitor that is coupled between the output terminal of the charge pump and ground.

3. The apparatus of claim 2, wherein the output terminal of the charge pump further comprise a first output terminal, and wherein the charge pump further comprises a second output terminal that is coupled to each switched capacitor circuit.

4. The apparatus of claim 3, wherein N is 2 and the maximum divide ratio is 5.

5. The apparatus of claim 3, wherein the storage capacitor further comprise a first storage capacitor, and wherein the apparatus further comprises a second storage capacitor that is coupled between the second output terminal of the charge pump and ground.

6. The apparatus of claim 5, wherein each switched capacitor circuit further comprises:
    a flying capacitor;
    a set of grounding switches, wherein each grounding switch is coupled to the flying capacitor; and
    a set of output switches, wherein at least one output switch from the set is coupled between the flying capacitor and the output terminal of the charge pump.

7. The apparatus of claim 6, wherein at least one of the switched capacitor circuits further comprises a set of interconnection switches that are each coupled to the flying capacitor.

8. The apparatus of claim 7, wherein the set output switches for each switched capacitor circuit further comprises:
    a first output switch that is coupled between the flying capacitor and the first output terminal of the charge pump; and
    a second output switch that is coupled between the flying capacitor and the second output terminal of the charge pump.

9. The apparatus of claim 8, wherein the first output terminal is a positive voltage rail, and wherein the second output terminal is a negative voltage rail.

10. A method comprising:
    in a first phase, coupling at least one of N flying capacitors within a charge pump in series between an input voltage terminal of the charge pump and a first output terminal of the charge pump; and
    in a second phase, equalizing the first output terminal of the charge pump and a second output terminal of the charge pump, wherein a first storage capacitor is coupled between the first output terminal and ground, and wherein the second storage capacitor is coupled between the second output terminal and ground;
    in a third phase, coupling at least one of the N flying capacitors between a common node and a second output terminal of the charge pump; and
    in the third phase, iteratively coupling a set of flying capacitors from the N flying capacitors between the common node and the first output terminal of the charge pump with the set of flying capacitors increasing with each iteration, wherein the charge pump has a maximum divide ratio of $3 \cdot 2^{(N-1)} - 1$.

11. The method of claim 10, wherein the N is 2 and the maximum divide ratio is 5.

12. The method of claim 10, wherein the step of equalizing further comprises:
    coupling at least one of the N flying capacitors in parallel to the first storage capacitor; and
    coupling the at least one of the N flying capacitors in parallel to the second storage capacitor.

13. The method of claim 12, wherein the first output terminal is a positive voltage rail, and wherein the second output terminal is a negative voltage rail.

14. An apparatus comprising:
    a driver;
    a charge pump having:
        an input voltage terminal;
        a first output terminal;
        a second output terminal; and
        a plurality of switched capacitor circuits, wherein each switched capacitor circuit is coupled to the first and second output terminals, and wherein each switched capacitor circuit is controlled by the driver, and wherein at least one of the switched capacitor circuits is coupled to the input voltage terminal, and wherein each switched capacitor circuit includes a flying capacitor, and wherein, in an operational mode, the driver couples at least one of the flying capacitors between a common node and the second output terminal and couples a set of i-1 flying capacitors between the common node and the first output terminal of the charge pump, wherein the charge pump has a divide radio of $3 \cdot 2^{(i-1)} - 1$;
    a first storage capacitor that is coupled between the first output terminal and ground; and
    a second storage capacitor that is coupled between the second output terminal and ground.

15. The apparatus of claim 14, wherein the operational mode further comprises a first operational mode, and wherein the driver, in a second operational mode, couples at least one of the flying capacitors between the common node and the second output terminal, and a set of flying capacitors between the common node and the first output terminal.

16. The apparatus of claim 15, wherein the first output terminal is a positive voltage rail, and wherein the second output terminal is a negative voltage rail.

17. The apparatus of claim 15, wherein each flying capacitor has a first electrode and a second electrode, each switched capacitor circuit further comprises:

a first grounding switch that is coupled between the first electrode of its flying capacitor and ground;

a second grounding switch that is coupled between the second electrode of its flying capacitor and ground;

a first output switch that is coupled between the first electrode of its flying capacitor and the first output terminal;

a second output switch that is coupled between the second electrode of its flying capacitor and the first output terminal; and a third output switch that is coupled between the second electrode of its flying capacitor and the second output terminal.

18. The apparatus of claim 17, wherein at least one of the switched capacitor circuits further comprises:

a first interconnection switch that is coupled between the first electrode of its flying capacitor and an output node; and a second interconnection switch that is coupled between the second electrode of its flying capacitor and the output node.

19. The apparatus of claim 18, wherein at least one of the switched capacitor circuits further comprises an input switch that is coupled between the input terminal and the first electrode of its flying capacitor.

20. The apparatus of claim 19, wherein there are 2 switched capacitor circuits and a maximum divide ratio is 5.

* * * * *